United States Patent
Han et al.

(10) Patent No.: US 12,118,996 B2
(45) Date of Patent: Oct. 15, 2024

(54) METHOD FOR PROCESSING VOICE SIGNALS OF MULTIPLE SPEAKERS, AND ELECTRONIC DEVICE ACCORDING THERETO

(71) Applicant: Samsung Electronics Co., Ltd., Suwon-si (KR)

(72) Inventors: Young Ho Han, Suwon-si (KR); Nam Hoon Kim, Suwon-si (KR); Jae Young Roh, Suwon-si (KR); Chi Youn Park, Suwon-si (KR); Kyung Min Lee, Suwon-si (KR); Keun Seok Cho, Suwon-si (KR); Jong Youb Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/975,074

(22) Filed: Oct. 27, 2022

(65) Prior Publication Data

US 2023/0040938 A1    Feb. 9, 2023

Related U.S. Application Data

(63) Continuation of application No. 16/755,383, filed as application No. PCT/KR2018/013821 on Nov. 13, 2018, now Pat. No. 11,495,222.

(30) Foreign Application Priority Data

Dec. 19, 2017  (KR) .................. 10-2017-0175339

(51) Int. Cl.
G10L 15/00   (2013.01)
G10L 15/02   (2006.01)
(Continued)

(52) U.S. Cl.
CPC .............. *G10L 15/22* (2013.01); *G10L 15/02* (2013.01); *G10L 15/10* (2013.01)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 6,842,510 B2     1/2005  Sakamoto
11,495,222 B2 *  11/2022 Han ........................ G10L 15/10
(Continued)

FOREIGN PATENT DOCUMENTS

JP    2017-009825 A     1/2017
KR    10-0779242 B1    11/2007
(Continued)

OTHER PUBLICATIONS

International Search Report and Written Opinion dated Feb. 19, 2019, issued in International Patent Application No. PCT/KR2018/013821.

(Continued)

*Primary Examiner* — Vu B Hang
(74) *Attorney, Agent, or Firm* — Jefferson IP Law, LLP

(57) ABSTRACT

Disclosed is an electronic device. The electronic device includes a processor configured to execute one or more instructions stored in a memory to: control a receiver to receive a speech signal; determine whether the received speech signal includes speech signals of a plurality of different speakers; when the received speech signal includes the speech signals of the plurality of different speakers, detect feature information from a speech signal of each speaker; determine relations between pieces of speech content of the plurality of different speakers, based on the detected feature information; determine a response method (Continued)

based on the determined relations between the pieces of speech content; and control the electronic device such that an operation of the electronic device is performed according to the determined response method.

20 Claims, 8 Drawing Sheets

(51) Int. Cl.
*G10L 15/10* (2006.01)
*G10L 15/22* (2006.01)

(58) Field of Classification Search
CPC ....... G10L 15/063; G10L 15/08; G10L 25/78; G10L 25/87; G10L 15/04; G10L 15/10; G10L 21/0208; G10L 15/1822; G10L 15/183; G10L 15/193; G10L 15/19; G10L 17/00; G10L 17/02; G10L 17/04; G10L 17/06

See application file for complete search history.

(56) References Cited

U.S. PATENT DOCUMENTS

| | | |
|---|---|---|
| 2015/0149182 A1* | 5/2015 | Kalns ............... G10L 15/18 704/275 |
| 2017/0178666 A1 | 6/2017 | Yu |
| 2017/0357478 A1 | 12/2017 | Piersol et al. |
| 2019/0026075 A1 | 1/2019 | Kim et al. |

FOREIGN PATENT DOCUMENTS

| | | |
|---|---|---|
| KR | 10-0881243 B1 | 2/2009 |
| KR | 10-1081972 B1 | 11/2011 |
| KR | 10-1160071 B1 | 6/2012 |
| KR | 10-2014-0042642 A | 4/2014 |
| KR | 10-2017-0049817 A | 5/2017 |

OTHER PUBLICATIONS

Korean Office Action dated Apr. 12, 2022, issued in Korean Patent Application No. 10-2017-0175339.

* cited by examiner

METHOD FOR PROCESSING VOICE SIGNALS OF MULTIPLE SPEAKERS, AND ELECTRONIC DEVICE ACCORDING THERETO

CROSS-REFERENCE TO RELATED APPLICATION(S)

This application is a continuation application of prior application Ser. No. 16/755,383, filed on Apr. 10, 2020, which application is a U.S. National Stage application under 35 U.S.C. § 371 of an International application number PCT/KR2018/013821, filed on Nov. 13, 2018, which is based on and claims priority under 35 U.S.C § 119(a) of a Korean patent application number 10-2017-0175339, filed on Dec. 19, 2017, in the Korean Intellectual Property Office, the disclosure of which is incorporated by reference herein in its entirety.

TECHNICAL FIELD

The present disclosure relates to a method of processing a speech signal and an electronic device according thereto. More particularly, the present disclosure relates to a method of processing speech signals spoken simultaneously by a plurality of speakers and an electronic device according to the method.

BACKGROUND ART

To improve manipulability, electronic devices having speech recognition functions have been released. Speech recognition functions allow operations of electronic devices to be performed by using speech signals of users without manipulating buttons or making contact with touch modules.

For example, in handheld terminals such as smart phones, speech recognition functions allow the conduct of various functions such as turning-on or turning-off power by speech signals of users, performing call functions, transmitting or receiving text messages, getting directions, searching the Internet, setting alarms, taking pictures, and the like, without separate operations of pressing buttons.

Existing speech recognition functions allow operations of electronic devices to be performed based on speech signals of registered speakers. Specifically, electronic devices have been proposed, the electronic devices being configured to perform speaker recognition on speech signals and to determine whether to perform a subsequent operation, for example, an operation of permitting or restricting use of the electronic devices, a subsequent speech recognition operation, or the like, according to a result of the speaker recognition.

DESCRIPTION OF EMBODIMENTS

Technical Problem

As artificial intelligence (AI) imitating human brain functions such as recognition, determination, and the like by using machine learning algorithms such as deep learning has recently become a significant trend driving future innovation, there is a need for a method of recognizing speech signals spoken simultaneously by a plurality of speakers without conflicts at a human-intelligence level as well as accurately recognizing a single speaker, and performing operations of an electronic device according to a result of the recognition, and there is also a need for an electronic device according to the method.

Solution to Problem

Embodiments of the present disclosure provide a method of processing speech signals of a plurality of speakers, the method including adjusting or mediating pieces of speech content spoken simultaneously by the plurality of speakers based on relations between the pieces of speech content spoken simultaneously by the plurality of speakers, and the embodiments of the present disclosure also provide an electronic device according to the method.

Embodiments of the present disclosure provide a method of processing speech signals of a plurality of speakers, the method including: determining relations between pieces of speech content spoken simultaneously by the plurality of speakers by using a machine learning module or a language understanding module; and adjusting or mediating the pieces of speech content of the plurality of speakers based on the determined relations between the pieces of speech content, and the embodiments of the present disclosure also provide an electronic device according to the method.

Advantageous Effects of Disclosure

According to an embodiment of the present disclosure, relations between pieces of speech content of a plurality of speakers may be comprehensively determined, and the pieces of speech content of the plurality of speakers may be adjusted or mediated not to cause conflicts between the pieces of speech content of the plurality of speakers according to a result of the determination, thereby improving a recognition rate of simultaneously spoken speech intentions of the plurality of speakers and providing results consistent with the speech intentions of the plurality of speakers.

BEST MODE

Figure 1:
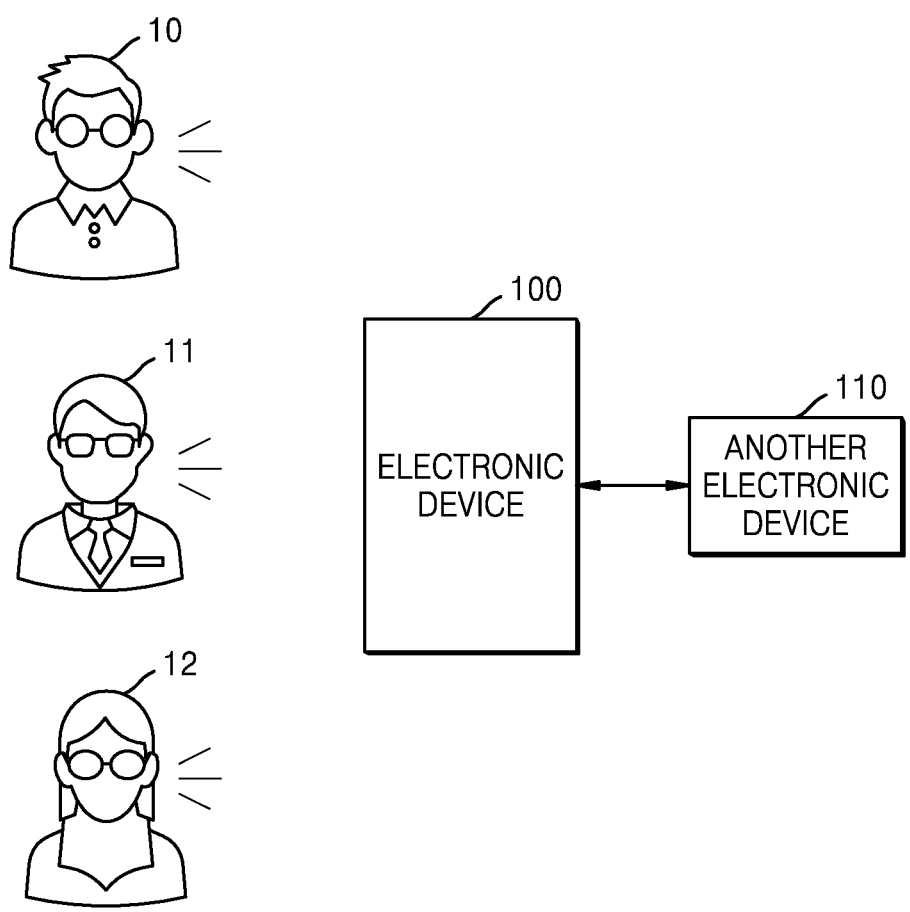
FIG. 1 is a schematic diagram illustrating processing of speech signals spoken by a plurality of speakers, according to an embodiment.

To solve the issues set forth above, according to a first aspect of the present disclosure, there is provided an electronic device including: a receiver receiving a speech signal; a memory storing one or more instructions; and a processor configured to execute the one or more instructions stored in the memory, wherein the processor is configured to execute the one or more instructions to: control the receiver to receive a speech signal; determine whether the received speech signal includes speech signals of a plurality of different speakers; when the received speech signal includes the speech signals of the plurality of different speakers, detect feature information from a speech signal of each speaker; determine relations between pieces of speech content of the plurality of different speakers, based on the detected feature information; determine a response method based on the determined relations between the pieces of speech content of the plurality of different speakers; and control the electronic device such that an operation of the electronic device is performed according to the determined response method.

The processor may be configured to execute the one or more instructions to determine the relations between the pieces of speech content of the plurality of different speakers by using a machine learning module or a language understanding module.

The feature information may include at least one of speaker information, a speaker position, a voice volume, a speech time point, a speech domain, speech content, an inter-speaker relation, a relation between a previous speaker and a current speaker.

The determining of the relations between the pieces of speech content of the plurality of different speakers may include determining whether the pieces of speech content of the plurality of different speakers have independent relations to each other or non-independent relations to each other.

When the pieces of speech content of the plurality of different speakers have independent relations to each other, the processor may be further configured to execute the one or more instructions to: determine priorities of the pieces of speech content; and determine the response method based on the determined priorities.

When it is determined that the pieces of speech content of the plurality of different speakers have independent relations to each other and that conflicts occur between the pieces of speech content of the plurality of different speakers, the processor may be further configured to execute the one or more instructions to determine the response method such that another electronic device performs an operation corresponding to a piece of speech content determined to have a low priority.

When the pieces of speech content of the plurality of different speakers have non-independent relations to each other, the processor may be further configured to execute the one or more instructions to: combine the pieces of speech content of the plurality of different speakers; and determine the response method such that the operation is performed based on the combined pieces of speech content.

In addition, according to a second aspect of the present disclosure, there is provided a method, performed by an electronic device, of processing a speech signal, the method including: receiving a speech signal through a receiver of the electronic device; determining, by a processor of the electronic device, whether the received speech signal includes speech signals of different speakers; when the received speech signal includes the speech signals of the different speakers, detecting, by the processor, feature information from a speech signal of each speaker; determining, by the processor, relations between pieces of speech content of the different speakers, based on the detected feature information; determining, by the processor, a response method based on the determined relations between the pieces of speech content; and controlling, by the processor, the electronic device such that an operation of the electronic device is performed according to the determined response method.

Further, according to a third aspect of the present disclosure, there is provided a computer-readable recording medium having recorded thereon a program for executing the method of the second aspect of the present disclosure on a computer.

Mode of Disclosure

Hereinafter, embodiments of the present disclosure will be described in detail with reference to the accompanying drawings such that one of ordinary skill in the art may readily make implementations thereof. However, it should be understood that the present disclosure may be embodied in different ways and is not limited to embodiments described herein. In addition, portions irrelevant to the description will be omitted from the drawings for clarity, and like components will be denoted by like reference numerals throughout the specification.

Throughout the specification, when an element is referred to as being "connected to" another element, the element may be "directly connected to" the other element, or the element may also be "electrically connected to" the other element with an intervening element therebetween. In addition, when an element is referred to as "including" or "comprising" another element, unless otherwise stated, the element may further include or comprise yet another element rather than preclude the yet other element.

A phrase such as "in some embodiments" or "in an embodiment (or in one embodiment)", which appears in various places herein, does not always indicate the same embodiment.

Some embodiments may be represented by functional block components and various processing operations. Some or all of such functional blocks may be implemented by various numbers of hardware and/or software components for performing particular functions. For example, the functional blocks of the present disclosure may be implemented by one or more processors or microprocessors or may be implemented by circuit components for certain functions. In addition, for example, the functional blocks of the present disclosure may be implemented by various programming or scripting languages. The functional blocks may be implemented by algorithms executed by the one or more processors. In addition, the present disclosure may employ techniques according to the related art, for electronic environment settings, signal processing, data processing, and/or the like. Terms such as "module" and "component" may be broadly used and are not limited to mechanical and physical components.

In addition, connection lines or connection members between components illustrated in the drawings merely represent examples of functional connections and/or physical or circuit connections. In actual devices, connections between components may be represented by various functional, physical, or circuit connections, which may be substituted or added.

Although terms used herein are of among general terms which are currently and broadly used by considering functions in the present disclosure, these terms may vary according to intentions of those of ordinary skill in the art, precedents, the emergence of new technologies, or the like. In addition, there may be terms selected arbitrarily by the applicants in particular cases, and in these cases, the meaning of those terms will be described in detail in the corresponding portions of the detailed description. Therefore, the terms used herein should be defined based on the meaning thereof and descriptions made throughout the specification, rather than based on names simply called.

Hereinafter, the present disclosure will be described in detail with reference to the accompanying drawings.

Embodiments of the present disclosure relate to a method of processing speech signals spoken by a plurality of speakers and an electronic device for the method. It may be mentioned that embodiments of the present disclosure relate to a method of processing speeches of a plurality of speakers and an electronic device according thereto.

Speech signals of a plurality of speakers may be spoken almost simultaneously or may be spoken with time differences therebetween. The speech signals of the plurality of speakers may have different speech distances from each other. A speech distance may represent a distance between the electronic device and a speaker. The speech signals of the plurality of speakers may be represented by a plurality of audio signals.

The speeches of the plurality of speakers may include, but are not limited to, at least one of speeches toward the electronic device, speeches toward other speakers, and speeches between the speakers. Whether the speeches of the plurality of speakers are speeches toward the electronic device, speeches toward other speakers, or speeches between the speakers may be determined based on a relation between pieces of speech content of the plurality of speakers, as will be described below.

According to an embodiment of the present disclosure, it is allowed to: receive a speech signal; when the received speech signal includes speech signals of a plurality of speakers, detect feature information from a speech signal of each speaker; determine a relation between pieces of speech content of the plurality of speakers, based on the detected feature information; determine a response method for the received speech signal, based on the determined relation between the pieces of speech content of the plurality of speakers; and perform an operation of an electronic device based on the determined response method.

Accordingly, the electronic device according to the present disclosure may include a module for determining whether the received speech signal includes the speech signals of the plurality of speakers, a module for detecting the feature information from the speech signal of each speaker, a module for determining the relation between the pieces of speech content of the plurality of speakers, and a module for determining the response method based on the relation between the pieces of speech content of the plurality of speakers, although components of the electronic device are not limited to those described above.

The determining of the relation between the pieces of speech content of the plurality of speakers may be performed by using a machine learning module, a language understanding module, or at least one neural network, although the present disclosure is not limited thereto. Using a neural network may denote using an artificial intelligence application installed in an electronic device 100. The neural network may refer to an algorithm set for comprehensively determining the relation between the pieces of speech content of the plurality of speakers based on the feature information detected from the input speech signals of the plurality of speakers, by using a result of statistical machine learning, and for detecting speech intentions of the plurality of speakers. In addition, the neural network may be implemented by software, an engine, or the like for executing the algorithm set described above. The neural network implemented by software, an engine, or the like may be executed by a processor included in the electronic device 100 or a processor included in a server (not shown). An operation performed by using the machine learning module, the language understanding module, or the at least one neural network is not limited to the determining of the relation between the pieces of speech content of the plurality of speakers. For example, the machine learning module, the language understanding module, or the at least one neural network may be used to determine the response method mentioned in an embodiment of the present disclosure.

The electronic device according to the present disclosure may include all electronic devices capable of being operated according to speech signals that are almost simultaneously spoken by a plurality of speakers. Specifically, the electronic device according to the present disclosure may receive an audio signal including a speech of a human and perform a speaker recognition function on the received audio signal. The speaker recognition function refers to a function of performing speaker registration based on a recognized speech signal, determining the correctness or not of a registered speaker based on the recognized speech signal, or determining whether to perform a certain subsequent operation based on the above-described determination.

The electronic device according to an embodiment of the present disclosure may include, but is not limited to, mobile computing devices, such as a wearable device, a smart phone, a tablet personal computer (PC), a PC, a personal digital assistant (PDA), a laptop computer, a media player, a micro-server, a global positioning system (GPS) device, an electronic book terminal, a digital broadcasting terminal, a navigator, a kiosk, an MP3 player, a digital camera, a smart speaker, an electronic control device of a car, and a central information display (CID), or non-mobile computing devices. In addition, the electronic device according to an embodiment of the present disclosure may include household appliances controllable by a home Internet-of-Things (IoT) platform, for example, a television (TV), a washing machine, a refrigerator, a microwave oven, an electric oven, an air conditioner, a vacuum cleaner, a computer, and the like, which are placed in a home.

The electronic device according to an embodiment of the present disclosure may be included or mounted in the mobile computing devices, the non-mobile computing devices, or the devices controllable by a home IoT platform.

FIG. 1 is a schematic diagram illustrating processing speech signals spoken by a plurality of speakers, according to an embodiment.

Referring to FIG. 1, a first speaker 10, a second speaker 11, and a third speaker 12 may speak speech signals at the same time point or almost similar time points. All the speech signals spoken by the first, second, and third speakers 10, 11, and 12 may be speeches toward the electronic device 100. The speech signals spoken by the first, second, and third speakers 10, 11, and 12 may each be at least one of a speech toward the electronic device 100, a speech toward another speaker, and a speech between the speakers. Although a plurality of speakers in FIG. 1 include the first speaker 10, the second speaker 11, and the third speaker 12, a plurality of speakers in an embodiment of the present disclosure are not limited to those illustrated in FIG. 1. For example, the number of speakers in an embodiment of the present disclosure may be less than or greater than the number of speakers shown in FIG. 1.

The electronic device 100 of FIG. 1 receives the speech signals spoken by the first, second, and third speakers 10, 11, and 12. The electronic device 100 determines whether the received speech signals include speech signals of the first, second, and third speakers 10, 11, and 12, which are different speakers from each other.

The electronic device 100 may detect, for example, speaker recognition feature vectors from the received speech signals, and may determine whether the received speech signals include speech signals of a plurality of different speakers (for example, the first speaker 10, the second speaker 11, and the third speaker 12) based on features and distances of the detected speaker recognition feature vectors. The electronic device 100 may determine whether the received speech signals include two or more sound sources, by using phase differences between the speech signals received through multiple microphones (for example, array-microphones) included in or connected to the electronic device 100. In addition, the electronic device 100 may detect a sound source at a position A and a sound source at a position B by using the above-described phase differences between the speech signals. When receiving the speech signals through one microphone included in or connected to the electronic device 100, the electronic device 100 may separate the speech signals of the plurality of speakers from the received speech signals by using a signal separation algorithm (for example, principal component analysis, independent component analysis, or the like), thereby determining whether the received speech signals include the speech signals of the plurality of speakers (for example, the first speaker 10, the second speaker 11, and the third speaker 12). A method of determining whether the received speech signals include the speech signals of the plurality of speakers is not limited to that described above.

The electronic device 100 may convert received time-domain-based speech signals into speech signals in a frequency domain and transform the converted signals such that the converted signals have different frequency energies from each other, thereby detecting the speaker recognition feature vectors from the received speech signals. Although the speaker recognition feature vectors may include, for example, a mel-frequency cepstral coefficient (MFC) or filter bank energy, the present disclosure is not limited thereto, and the speaker recognition feature vectors may be detected from the speech signals in various manners. The speaker recognition feature vectors may be represented by feature values allowing the speech signals of the respective speakers to be distinguished. When a plurality of speaker recognition feature vectors are detected from the speech signals, the electronic device 100 may determine that the received speech signals include the speech signals respectively spoken by the different speakers.

The electronic device 100 may generate speaker information indicating a speaker that has spoken, based on the speaker recognition feature vectors detected from the speech signals. It may be determined whether the speaker having spoken a speech signal is a registered speaker or a speaker capable of waking up the electronic device 100 among registered speakers, based on the generated speaker information. The electronic device 100 may register a plurality of pieces of speaker information. A speaker capable of waking up the electronic device 100 among a plurality of registered speakers may be a main user of the electronic device 100. The plurality of registered speakers may be users that may jointly use the electronic device 100. When the electronic device 100 is, for example, a TV, the plurality of speakers registered with the electronic device 100 may be family members residing together in a house.

To recognize a speaker based on the speaker recognition feature vectors detected from the received speech signals, the electronic device 100 may store, in advance, speaker recognition feature vectors of the plurality of speakers for comparison with the detected speaker recognition feature vectors. The electronic device 100 may request the speaker recognition feature vectors of the plurality of speakers from an external device such as a server and may recognize a speaker by comparing the speaker recognition feature vectors detected from the received speech signals with the speaker recognition feature vectors of the plurality of speakers, which are received from the external device.

When it is determined that the received speech signals include a plurality of speech signals respectively spoken by different speakers, the electronic device 100 may detect feature information from a speech signal of each speaker, which is included in the received speech signals. The feature information may include, for example, speaker information (or speaker identification information), a voice volume, a pitch, a pitch range, a speech rate, a speech distance (or a speaker position), a speech time point, speech content, a relation between speakers, a current speech domain, or the like, although the feature information of the present disclosure is not limited thereto.

The electronic device 100 may compare the speaker recognition feature vectors detected from the received speech signals with the speaker recognition feature vectors stored in advance and may detect speaker information corresponding to each matched speaker recognition feature vector as speaker information of each received speech signal. In the present disclosure, a method of detecting the speaker information of each received speech signal is not limited to that described above.

The electronic device 100 may detect a voice volume of each speaker based on energy of each received speech signal. Before detecting the voice volume of each speaker, the electronic device 100 may separate the speech signal of each speaker from the received speech signals. In addition, when comparing energies of the speech signals of the respective speakers or receiving the speech signals, the electronic device 100 may consider the magnitude of ambient noise or the like and information about a space in which a microphone for receiving the speech signals is mounted, thereby detecting the voice volume of each speaker. In the present disclosure, the detecting of the voice volume of each speaker is not limited to that described above.

The electronic device 100 may detect a pitch of each speaker in the manner of extracting a fundamental frequency (FO) value from the received speech signals. The electronic device 100 may extract a fundamental frequency by various algorithms using autocorrelation or harmonics of the received speech signals. In the present disclosure, a method of detecting the pitch of each speaker from the received speech signals is not limited to that described above.

The electronic device 100 may detect a pitch range of each speaker by measuring a formant of the speech signal of each speaker, which is separated from the received speech signals. The electronic device 100 may measure the formant by using linear predictive coefficients (LPC) or deep learning. In the present disclosure, a method of detecting the pitch range of the speech signal of each speaker is not limited to that described above.

The electronic device 100 may detect a speech rate of each speaker by using an output value of a speech recognition algorithm for the received speech signals. The electronic device 100 may detect the speech rate of each speaker by using an alignment value of a phoneme unit of the speech recognition algorithm. In the present disclosure, a method of detecting the speech rate of each speaker is not limited to that described above.

The electronic device 100 may detect both a speech distance (or a speaker position) and a direction of each speaker from the received speech signals by using phase differences and energy differences between respective microphones. The electronic device 100 may detect speech distances between the speakers based on the speech distance and direction of each speaker. In the present disclosure, a method of detecting the speech distance and direction of each speaker is not limited to that described above.

The electronic device 100 may detect a speech time point from the received speech signals by using a voice activation detection (VAD) technique or deep learning. In the present disclosure, a method of detecting the speech time point is not limited to that described above.

The electronic device 100 may detect speech content of each speaker from the received speech signals by using a speech recognizer. In the present disclosure, a method of detecting the speech content is not limited to that described above.

When the speaker information is detected from the received speech signals, the electronic device 100 may detect relation information between speakers included in the currently received speech signals by making reference to pre-stored relation information between speakers. A method of detecting the relation information between the speakers is not limited to that described above. The relation between the speakers may represent a relation between speakers of currently spoken speech signals. The relation between the speakers may represent the relation between the speakers of the currently spoken speech signals and a relation between speakers of previously spoken speech signals.

The electronic device 100 may detect a current speech domain based on the speech content detected from the received speech signals. For example, the electronic device 100 may determine domain weights for all vocabularies in advance and, by using the determined domain weights, may detect the speech domain based on vocabularies included in a spoken sentence of each speaker, which is included in the received speech signals. In addition, after configuring a probability model, the electronic device 100 may train the probability model in the manner of supervised learning and may predict a domain of the sentence included in the received speech signals by using the trained probability model. An algorithm used for the prediction may include, for example, deep learning, Support Vector Machine (SVM), Classification and Regression Trees (CART), or the like. For example, the speech domain may be defined based on the electronic device 100, for example, a TV, a refrigerator, or the like. The speech domain may be defined based on a function of the electronic device 100, for example, playing content, recording content, accessing the Internet, turning on or off power, or the like.

The electronic device 100 may determine a relation between pieces of speech content spoken by the plurality of speakers, based on feature information detected from a detected speech signal spoken by each speaker. The determining of the relation between the pieces of speech content spoken by the plurality of speakers is for performing adjustment or mediation such that conflicts do not occur between the received pieces of speech content of the plurality of speakers. The relation between the pieces of speech content may represent a relation between pieces of speech content of currently spoken speech signals. The relation between the pieces of speech content may represent a relation between a piece of speech content of a currently spoken speech signal and a piece of speech content of a previously spoken speech signal. The speech content may be expressed as a speech intention.

The relation between the pieces of speech content may include an independent or non-independent relation between the pieces of speech content spoken by the plurality of speakers. That the pieces of speech content of the different speakers have independent relations to each other denotes that the pieces of speech content respectively spoken by the different speakers have no relation to each other. That the pieces of speech content of the different speakers have non-independent relations to each other denotes that at least some portions of the pieces of speech content spoken by the different speakers have associations or are identical.

For example, when a piece of speech content spoken by one speaker includes a command "Order" and a piece of speech content spoken by another speaker includes a command "Do it", the electronic device 100 may determine that the pieces of speech content of the different speakers have a non-independent relation. However, when the piece of speech content spoken by the one speaker includes the command "Order" and the piece of speech content spoken by the other speaker includes a command "Turn it off", the electronic device 100 may determine that the pieces of speech content of the different speakers have an independent relation. That the pieces of speech content of the different speakers have an independent relation may denote that the piece of speech content of one of the speakers is an additional explanation about the piece of speech content of the other of the speakers.

Independence between the pieces of speech content represents that speech intentions of the plurality of speakers are independent of each other. As an example of the independence between the pieces of speech content, a piece of speech content of the first speaker 10 may be completely different from that of the second speaker 11. The independence between the pieces of speech content denotes that there is no association between the pieces of speech content, and may be referred to as a speech intention contradiction.

When the pieces of speech content of the first, second, and third speakers 10, 11, and 12 have independence therebetween, the electronic device 100 may perform an individual operation regarding each of the pieces of speech content of the first, second, and third speakers 10, 11, and 12. When the pieces of speech content of the first, second, and third speakers 10, 11, and 12 have independence therebetween, the electronic device 100 may determine priorities of the speech intentions of the first, second, and third speakers 10, 11, and 12, based on the pieces of speech content of the first, second, and third speakers 10, 11, and 12 and/or relations between the first, second, and third speakers 10, 11, and 12, and may determine a response method according to the determined priorities.

The response method may include, for example, processing, by the electronic device 100, a piece of speech content determined to have a high priority, and processing, by another electronic device 100 independent of the electronic device 100, a piece of speech content determined to have a low priority.

When the priorities between the pieces of speech content of the first, second, and third speakers 10, 11, and 12 are determined, the electronic device 100 may classified the pieces of speech content into a piece of speech content needing to give a prompt response, a piece of speech content to be piled up in a queue, and a piece of speech content needing to give no response, although the classifying of the pieces of speech content is not limited to that described above.

In the case where the piece of speech content is determined as a piece of speech content needing to give a prompt response, the electronic device 100 performs an operation that is based on the determined piece of speech content. In the case where the piece of speech content is determined as a piece of speech content to be piled up in a queue, when it is time to process the piece of speech content piled up in the queue, the electronic device 100 may perform an operation based on the piece of speech content piled up in the queue. Accordingly, even when a speech signal spoken by a speaker is not received, the electronic device 100 may perform an operation based on the piece of speech content piled up in the queue. In the case where the piece of speech content is as a piece of speech content needing to give no response, the electronic device 100 may ignore the piece of speech content. The piece of speech content needing to give no response is, for example, the case where the corresponding piece of speech content has no relation to the conduct of an operation of the electronic device 100, and may be a speech between speakers.

When it is determined that a priority of a piece of speech content of the first speaker 10 is higher than a priority of a piece of speech content of the second speaker 11 according to the determined priorities and that the other electronic device 110 may perform an operation according to the piece of speech content of the second speaker 11, while performing an operation according to the piece of speech content of the first speaker 10, the electronic device 100 may control the other electronic device 110 to perform the operation according to the piece of speech content of the second speaker 11.

Accordingly, the first speaker 10 may check a response to the piece of speech content thereof through the electronic device 100, and the second speaker 11 may check a response to the piece of speech content thereof through the other electronic device 110. Here, the electronic device 100 may notify the second speaker 11 through the electronic device 100 that a response to the piece of speech content will be made by the other electronic device 110. Before providing the response to the piece of speech content of the first speaker 10, or while providing the response to the piece of speech content thereof, or after providing the response to the piece of speech content thereof, the electronic device 100 may provide the above-described notification to the second speaker 11. In order not to hinder the first speaker 10 from checking the response to the piece of speech content thereof through the electronic device 100, the notification may be provided in the form of subtitle information or transmitted through yet another electronic device (for example, a handheld terminal) carried by the second speaker 11.

When all the pieces of speech content of the first, second, and third speakers 10, 11, and 12 are independent of each other, the electronic device 100 may respectively provide pieces of response method information with respect to the pieces of speech content to the first, second, and third speakers 10, 11, and 12 through the electronic device 100. The pieces of response method information may be sequentially provided based on priority according to the speaker information of each of the first, second, and third speakers 10, 11, and 12 or based on the priority according to each piece of speech content. The pieces of response method information with respect to the pieces of speech content of the first, second, and third speakers 10, 11, and 12 may be simultaneously provided through a display of the electronic device 100. The pieces of response method information may be provided through handheld terminals carried by the first, second, and third speakers 10, 11, and 12, respectively. For this purpose, the electronic device 100 may store, in advance, information about the handheld terminals of the first, second, and third speakers 10, 11, and 12 or may request and receive the information about the handheld terminals of the first, second, and third speakers 10, 11, and 12 from an external device (for example, a server), and thus, the electronic device 100 may make use of the information. In addition, when the piece of speech content of the first speaker 10 has a top priority, while performing an operation according to the piece of speech content of the first speaker 10, the electronic device 100 may provide the response methods with respect to the pieces of speech content of the second and third speakers 11 and 12 through the electronic device 100 or respectively through other electronic devices carried by the second and third speakers 11 and 12.

When at least two of the pieces of speech content of the first, second, and third speakers 10, 11, and 12 have non-independent relations to each other, the electronic device 100 may combine the pieces of speech content having non-independent relations and thus generate and process a combined piece of speech content. For example, when the piece of speech content of the first speaker 10 has a non-independent relation to the piece of speech content of the second speaker 11 and the piece of speech content of the third speaker 12 has independent relations to both the piece of speech content of the first speaker 10 and the piece of speech content of the second speaker 11, the electronic device 100 may generate one piece of speech content by combining the piece of speech content of the first speaker 10 with the piece of speech content of the second speaker 11, may determine priorities between the generated piece of speech content and the piece of speech content of the third speaker 12, may determine a response method according to the determined priorities, and may perform an operation of the electronic device 100 according to the determined response method.

A non-independent relation between pieces of speech content denotes that speech intentions of a plurality of speakers are non-independent of each other. The non-independent relation between the pieces of speech content denotes that the speech intentions of the plurality of speakers are similar to each other. The non-independent relation between the pieces of speech content may denote, for example, that the piece of speech content of the second speaker 11 is an additional explanation about the piece of speech content of the first speaker 10. When the pieces of speech content have non-independent relations to each other, the electronic device 100 may determine speech intentions about the pieces of speech content of the plurality of speakers, which are included in a currently received speech signal, based on the pieces of speech content of the plurality of speakers, relations between the speakers, a relation between a previous piece of speech content and a current piece of speech content, a relation between a previous speaker and a current speaker, speech histories of the plurality of speakers, and the like, and may perform an operation or output a question according to a result of the determination. The question may be output a plurality of times until information needed to perform an operation according to the determined speech intention is collected.

Figure 2:
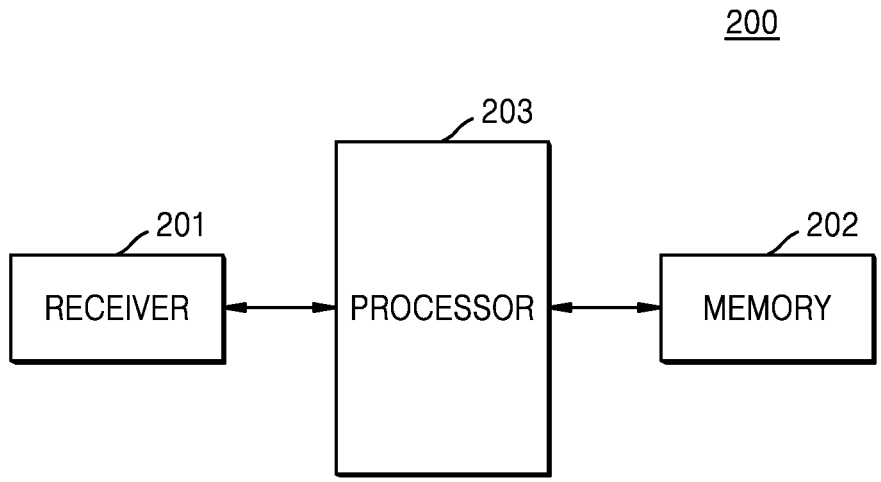
FIG. 2 is a block diagram illustrating an electronic device according to an embodiment.

FIG. 2 is a functional block diagram illustrating an electronic device according to an embodiment.

Referring to FIG. 2, an electronic device 200 according to an embodiment of the present disclosure includes a receiver 201, a memory 202, and a processor 203. The electronic device 200 may correspond to the electronic device 100 of FIG. 1. Therefore, all the descriptions related to the electronic device 100 of FIG. 1 may be applied to the electronic device 200.

The electronic device 200 may process speech signals spoken by a plurality of speakers.

The receiver 201 may receive an audio signal. The audio signal may include only a speech signal of a speaker. The speech signal of the speaker may include a speech signal of one speaker or speech signals of a plurality of speakers. In addition, the audio signal may include the speech signal of the speaker and an ambient sound signal or a noise signal generated in an environment in which the speech signal of the speaker is spoken. When the audio signal includes an ambient sound signal or a noise signal, the receiver 201 may detect only the speech signal of the speaker from the received audio signal to perform recognition processing on the speech signal of the speaker.

The receiver 201 may receive speech signals from a plurality of speakers through a speech receiving device such as a wireless microphone, a wired microphone, or the like. The plurality of speakers may be referred to as a user. The receiver 201 may receive a speech signal through a speech receiving device (not shown) external to the electronic device 200. In this case, the receiver 201 may include a communication module. The external speech receiving device (not shown) may include a device (for example, a wearable device) which each speaker has. The external speech receiving device may include a wireless or wired microphone mounted at a position independent of the electronic device 200.

The communication module included in the receiver 201 may include at least one communication module such as a short-range wireless communication module, a wired communication module, a mobile communication module, or a broadcast receiving module. In addition, the at least one communication module refers to a communication module capable of performing transmission and reception of data through a network conforming to a communication specification such as Bluetooth, Wireless Local Area Network (WLAN) (WiFi), Wireless broadband (Wibro), World Interoperability for Microwave Access (Wimax), Code Division Multiple Access (CDMA), or Wideband CDMA (WCDMA).

The memory 202 may store at least one of programs including one or more instructions for processing certain data and speech signals of a plurality of speakers.

In an embodiment of the present disclosure, the memory 202 may store identification information of a plurality of registered speakers, feature vectors for recognizing speech signals of a plurality of speakers, identification information of a speaker capable of waking up the electronic device 200, a speech history of each speaker, and relation information between registered speakers.

The processor 203 may read the relation information between the registered speakers from the memory 202 by using the identification information of the speaker. The processor 203 may read the speech history of each speaker from the memory 202 by using the identification information of the speaker. The processor 203 may read the speech history of each speaker from the memory 202 by further considering currently received speech content of a speaker.

In an embodiment of the present disclosure, the memory 202 may include at least one of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, and an optical disk.

By executing one or more instructions stored in the memory 202, the processor 203 may control the receiver 201 such that a speech signal is received by the receiver 201, and may determine whether the received speech signal includes speech signals of a plurality of speakers. The determining of whether the received speech signal includes the speech signals of the plurality of speakers may be performed as described regarding the electronic device 100 of FIG. 1.

When it is determined that the received speech signal includes the speech signals of the plurality of speakers, the processor 203 detects feature information of a speech signal of each speaker, which is included in the received speech signal. The feature information may be the same as that described with reference to FIG. 1.

When the feature information of the speech signal of each speaker is detected, the processor 203 determines relations between pieces of speech content of different speakers. The relations between the pieces of speech content of the different speakers may be determined as in the electronic device 100 of FIG. 1.

The processor 203 determines a response method based on the determined relations between the pieces of speech content. The processor 203 may determine the response method based on the determined relations between the pieces of speech content, as described regarding the electronic device 100 of FIG. 1.

The processor 203 may control an operation of the electronic device 200 according to the determined response method. Accordingly, the processor 203 may be referred to as a controller for controlling the operation of the electronic device 200.

When the feature information is detected from the speech signal of each speaker, the processor 203 may determine the relations between the pieces of speech content of the plurality of speakers by using one or more neural networks, a machine learning module, or a language understanding module and may determine the response method based on the determined relations between the pieces of speech content of the plurality of speakers.

When it is determined that the received speech signal includes a speech signal spoken by one speaker, the processor 203 may control the operation of the electronic device 200 based on a piece of speech content of the one speaker.

Figure 3:
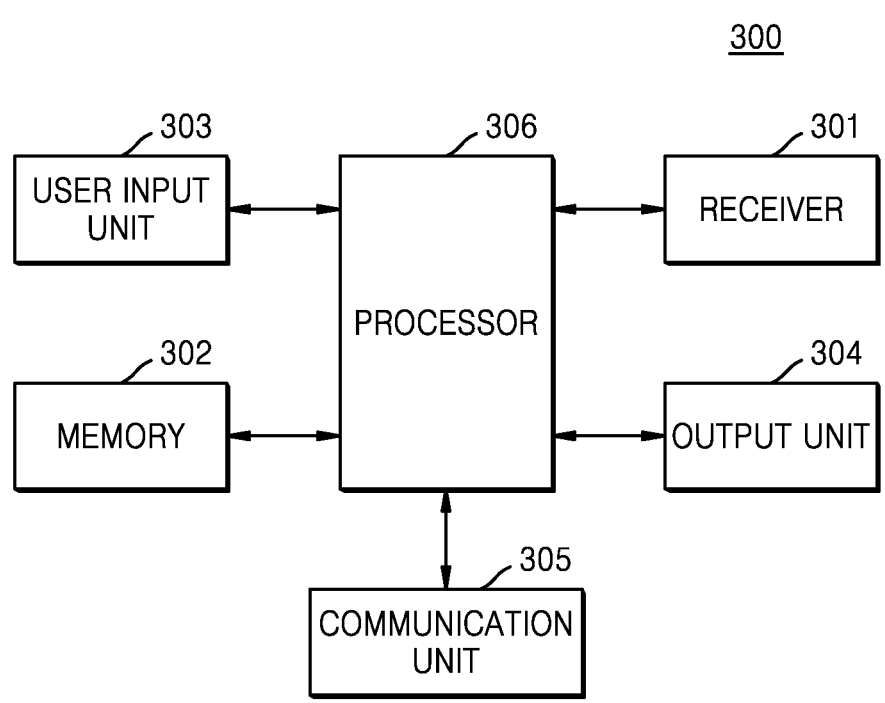
FIG. 3 is a block diagram illustrating an electronic device according to another embodiment.

FIG. 3 is a block diagram illustrating an electronic device according to another embodiment. An electronic device 300 shown in FIG. 3 may correspond to the electronic device 100 shown in FIG. 1 or the electronic device 200 shown in FIG. 2. In addition, a receiver 301 and a memory 302, which are shown in FIG. 3, may respectively correspond to the receiver 201 and the memory 202, which are shown in FIG. 2. Therefore, the descriptions made regarding the receiver 201 and the memory 202 with reference to FIG. 2 may be applied to the receiver 301 and the memory 302, which are shown in FIG. 3.

Referring to FIG. 3, the electronic device 300 further includes a user input unit 303, an output unit 304, and a communication unit 305, as compared with the electronic device 200. A processor 306 included in the electronic device 300 may control the electronic device 300 to be operated by using the further added components as compared with the components included in the electronic device 200.

The output unit 304 may include at least one of a loudspeaker (not shown) and a display (not shown). The loudspeaker (not shown) outputs an audio signal such that a speaker may audibly recognize certain information. In addition, the display (not shown) outputs a video signal such as a screen allowing a speaker to visually recognize certain information.

Further, in outputting the certain information to the speaker, the output unit 304 may output only the audio signal or may output only the video signal. Furthermore, the output unit 304 may simultaneously output the audio signal and the video signal.

The user input unit 303 may receive a user input for controlling the electronic device 300. The user input unit 303 may include a user input device including a touch panel for sensing a touch of a user, a button for receiving a push operation of the user, a wheel for receiving a rotation operation of the user, a keyboard, a dome switch, and the like, although the user input unit 303 in the present disclosure is not limited thereto.

In an embodiment of the present disclosure, the user input unit 303 may receive a touch input or a button input for inputting or selecting an answer to a question that is output by the output unit 304. The user input unit 303 refers to a means for the user to input data for controlling the electronic device 300. For example, the user input unit 303 may include, but is not limited to, a key pad, a dome switch, a touch pad (a touch capacitive type, a pressure resistive type, an infrared beam sensing type, a surface acoustic wave type, an integral strain gauge type, a piezoelectric type, or the like), a jog wheel, a jog switch, or the like.

According to an embodiment, the user input unit 303 may receive a user input caused by touching one of objects within an image displayed on a screen, by using a touch pad.

The communication unit 305 may allow communication between the electronic device 300 and another electronic device 110 that is shown in FIG. 1 or allow communication with a handheld terminal carried by each of the first, second, and third speakers 10, 11, and 12 or a unique terminal of each of the first, second, and third speakers 10, 11, and 12.

The communication unit 305 may be configured like a communication unit 450 that will be described below with reference to FIG. 4.

Figure 4:
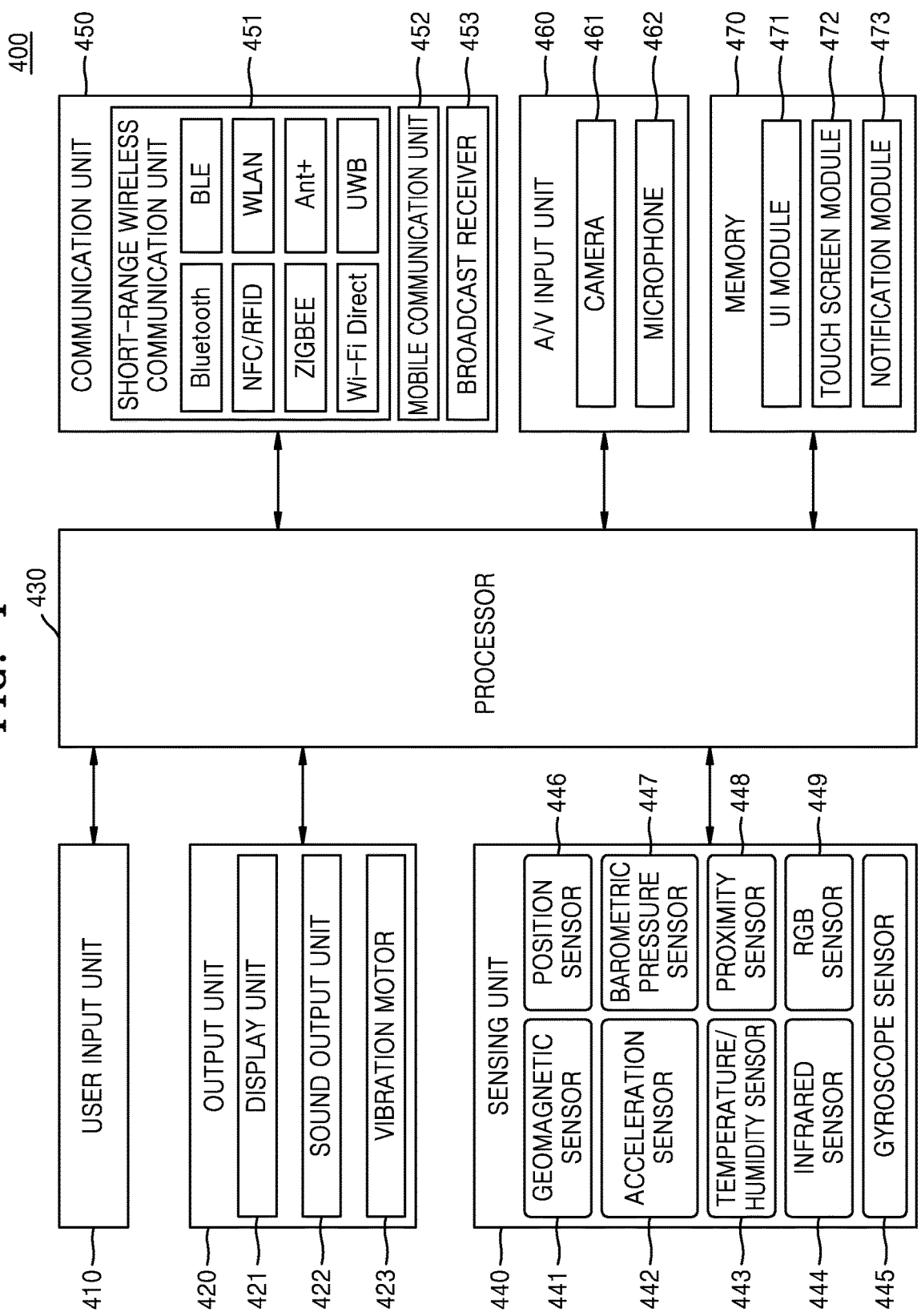
FIG. 4 is a block diagram illustrating an electronic device according to another embodiment.

FIG. 4 is a functional block diagram illustrating an electronic device according to yet another embodiment.

Referring to FIG. 4, an electronic device 400 may further include a sensing unit 440, an audio/video (A/V) input unit 460, and a processor 430, in addition to a memory 470, a user input unit 410, an output unit 420, and a communication unit 450 respectively corresponding to the memory 302, the user input unit 303, the output unit 304, and the communication unit 305.

The output unit 420 may output an audio signal, a video signal, or a vibration signal, and the output unit 420 may include a display unit 421, a sound output unit 422, and a vibration motor 423.

The display unit 421 displays information processed by the electronic device 400. When the display unit 421 and a touch pad form a layer structure and thus constitute a touch screen, the display unit 421 may also be used as an input device in addition to being used as an output device. The display unit 421 may include at least one of a liquid crystal display, a thin film transistor-liquid crystal display, an organic light-emitting diode display, a flexible display, a 3-dimensional (3D) display, an electrophoretic display, a transparent display.

The sound output unit 422 outputs audio data received from the communication unit 450 or stored in the memory 470. The vibration motor 423 may output a vibration signal.

The processor 430 generally perform a function of controlling overall operations of the electronic device 400 and controlling signal flow between internal components of the electronic device 400 and a function of processing data. For example, the processor 430 may take overall control of the user input unit 410, the output unit 420, the sensing unit 440, the communication unit 450, the A/V input unit 460, and the like by executing programs (one or more instructions) stored in the memory 470.

According to an embodiment, to perform the above-described functions of the electronic device 400, the processor 430 may determine relations between pieces of speech content of a plurality of speakers based on feature information of a received speech signal by using a neural network, a machine learning module, or a language understanding module, may determine a response method based on a result of the determination, and may control the components of the electronic device 400 to perform an operation consistent with the pieces of speech content of the plurality of speakers according to the determined response method. Because the processor 430 corresponds to the processor 306 of FIG. 3, descriptions thereof will be omitted.

The sensing unit 440 may sense a state of the electronic device 400 or a state around the electronic device 400 and may transfer sensed information to the processor 430. The sensing unit 440 may include, but is not limited to, at least one of a geomagnetic sensor 441, an acceleration sensor 442, a temperature/humidity sensor 443, an infrared sensor 444, a gyroscope sensor 445, a position sensor (for example, a global positioning system (GPS)) 446, a barometric pressure sensor 447, a proximity sensor 448, and an RGB sensor (illuminance sensor) 449. Because a function of each of the sensors (that is, 441 to 449) may be intuitively inferred from the name thereof by one of ordinary skill in the art, descriptions thereof will be omitted.

When making a determination regarding the pieces of speech content of the plurality of speakers, the processor 430 may further consider information sensed by the sensing unit 440. The information sensed by the sensing unit 440 may be interpreted as context information of the electronic device 400. Thus, an operation of the electronic device 440, which is consistent with a piece of speech content, may be an operation resulting from considering the information sensed by the sensing unit 440.

The communication unit 450 may include one or more components allowing communication with an external server (for example, an SNS server, a cloud server, a content providing server, or the like) and other external devices For example, the communication unit 450 may include a short-range wireless communication unit 451, a mobile communication unit 452, and a broadcast receiver 453.

The short-range wireless communication unit 451 may include, but is not limited to, a Bluetooth communication unit, a Bluetooth Low Energy (BLE) communication unit, a near field communication unit, a WLAN (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, or the like.

The mobile communication unit 452 transmits a radio signal to and receives a radio signal from at least one of a base station, an external terminal, and a server on a mobile communication network. Here, the radio signal may include various types of data according to transmission and reception of a voice call signal, a video call signal, or a text/multimedia message.

The broadcast receiver 453 receives a broadcast signal and/or broadcast-related information from outside thereof through a broadcast channel. The electronic device 400 may not include the broadcast receiver 453, according to an embodiment.

According to an embodiment, the communication unit 450 may receive speaker information from an external server and may provide the received speaker information to the processor 430. The processor 430 may be used to store the received speaker information in the memory 470 and detect the speaker information from a received speech signal. The speaker information may include speaker identification information and relation information between speakers.

The A/V input unit 460 is for inputting an audio signal or a video signal and may include a camera 461, a microphone 462, and the like.

The camera 461 captures an image in a camera recognition range. According to an embodiment, the image captured by the camera 461 may be processed by the processor 430 and thus displayed through the display unit 421. The image captured by using the camera 461 may be used to identify a received plurality of speakers. The image captured by using the camera 461 may be considered to determine relations between pieces of speech content of a plurality of speakers. The image captured by using the camera 461 may be used to determine a response method based on the relations between the pieces of speech content of the plurality of speakers.

The memory 470 may store programs (one or more instructions) for processing and control performed by the processor 430, and may store data that is input to the electronic device 400 or output from the electronic device 100. The programs stored in the memory 470 may correspond to the programs described above with reference to FIG. 3.

The programs stored in the memory 470 may be classified into a plurality of modules, for example, a user interface (UI) module 471, a touch screen module 472, a notification module 473, and the like, according to functions thereof.

The UI module 471 may provide a specialized UI, a graphics user interface (GUI), or the like interworking with the electronic device 400, on an application basis. The touch screen module 472 may sense a touch gesture of a user on a touch screen and may transfer information about the touch gesture to the processor 430. The touch screen module 472 according to an embodiment of the present disclosure may recognize and analyze a touch code. The touch screen module 472 may be configured by separate hardware including a controller.

To sense a touch or a proximity touch with respect to the touch screen, various sensors may be arranged inside or near the touch screen. An example of a sensor for sensing a touch with respect to the touch screen includes a tactile sensor. The tactile sensor refers to a sensor sensing a contact with a particular object to an extent felt by a human or to a higher extent. The tactile sensor may sense various pieces of information, such as roughness of a contact surface, hardness of a contact object, and a temperature of a contact point.

In addition, an example of a sensor for sensing a touch with respect to the touch screen includes a proximity sensor.

The proximity sensor refers to a sensor detecting an object approaching a certain detection surface or the presence or not of an object in the vicinity thereof, without mechanical contact, by using force of an electromagnetic field or using an infrared ray. Examples of the proximity sensor include a transmission type photoelectric sensor, a direct reflection type photoelectric sensor, a mirror reflection type photoelectric sensor, a high-frequency oscillation type proximity sensor, a capacitive proximity sensor, a magnetic proximity sensor, an infrared proximity sensor, and the like. The touch gesture of the user may include tap, touch and hold, double tap, drag, panning, flick, drag and drop, swipe, or the like.

The notification module 473 may generate a signal for notifying the occurrence of an event of the electronic device 400. Examples of the event occurring in the electronic device 400 include call signal reception, message reception, a key signal input, schedule notification, and the like. The notification module 473 may output a notification signal in the form of a video signal through the display unit 421, may output a notification signal in the form of an audio signal through the sound output unit 422, or may output a notification signal in the form of a vibration signal through the vibration motor 423. According to the present disclosure, the notification set forth above may include a notification about the speech content of the speaker, which has a low priority, the speech content having been described with reference to FIG. 1.

Configurations of the electronic devices 100, 200, 300, and 400 shown in FIGS. 1 to 4 are merely examples, and the respective components of each of the electronic devices 100, 200, 300, and 400 may be integrated, added, or omitted according to specifications of the electronic devices 100, 200, 300, and 400. That is, according to the needs, two or more components may be integrated into one component, or one component may be configured by two or more subdivided components. In addition, a function performed by each component (or module) is for describing embodiments, and a specific operation or device does not limit the scope of the present disclosure.

Figure 5:
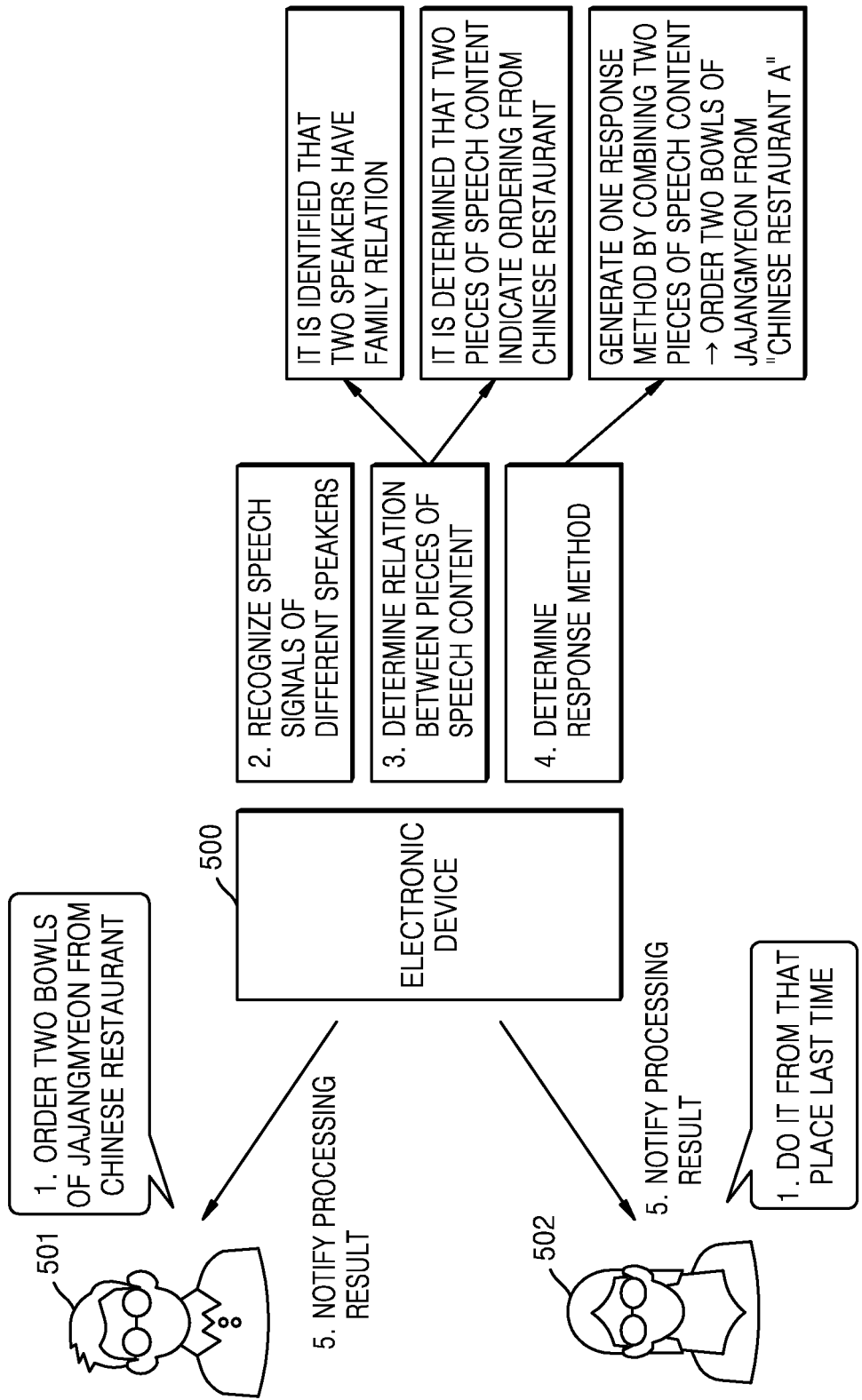
FIG. 5 is a diagram illustrating processing, performed by an electronic device, of speech signals spoken by a plurality of speakers, according to an embodiment.

FIG. 5 is a diagram illustrating processing, performed by an electronic device, of speech signals of a plurality of speakers, according to an embodiment. In FIG. 5, a first speaker 501 may correspond to the first speaker 10 shown in FIG. 1, a second speaker 502 may correspond to the third speaker 12 shown in FIG. 1, and an electronic device 500 may correspond to the electronic device 100 shown in FIG. 1.

Referring to FIG. 5, this is the case where a piece of speech content of the second speaker 502 is an additional explanation about a piece of speech content of the first speaker 501. The first speaker 501 is a registered speaker capable of waking up the electronic device 500, and the second speaker 502 is a speaker registered with the electronic device 500 although not being a speaker capable of waking up the electronic device 500. The first speaker 501 and the second speaker 502 have a family relation to each other. In the present disclosure, the relation between the first speaker 501 and the second speaker 502 is not limited to a family relation. For example, the relation between the first speaker 501 and the second speaker 502 may be an acquaintance relation.

The electronic device 500 may store, all together, speech feature information of the first speaker 501 and speech feature information of the second speaker 502, which respectively allow recognition of speech signals of the first speaker 501 and the second speaker 502, and inter-speaker relation information allowing recognition of the relation between the first speaker 501 and the second speaker 502. For example, when the first speaker 501 is a mother of the second speaker 502 and the second speaker 502 is a son of the first speaker 501, the inter-speaker relation information may include information indicating that the first speaker 501 is a mother of the second speaker 502 and the second speaker 502 is a son of the first speaker 501.

Accordingly, as shown in FIG. 5, when a speech signal spoken by the first speaker 501 and a speech signal spoken by the second speaker 502 are received, the electronic device 500 recognizes the speakers of the received speech signals. After recognizing the speakers, the electronic device 500 detects feature information of each of the received speech signals of the plurality of speakers and determines a relation between received pieces of speech content of the plurality of speakers based on the detected feature information. The electronic device 500 may determine the relation between the piece of speech content of the first speaker 501 and the piece of speech content of the second speaker 502 by further considering a relation between the first speaker 501 and the second speaker 502.

When the electronic device 500 determines that the first speaker 501 and the second speaker 502 have a family relation to each other and that the pieces of speech content indicate ordering from a Chinese restaurant, the electronic device 500 determines a response method based on the determined relation between the pieces of speech content.

In the case of FIG. 5, because the piece of speech content of the first speaker 501 and the piece of speech content of the second speaker 502 have a non-independent relation to each other, the electronic device 500 generates one piece of speech content resulting from combining the pieces of speech content of the first and second speakers 501 and 502 and determines a response method based on the generated piece of speech content. For example, as shown in FIG. 5, to determine a response method for ordering two bowls of jajangmyeon from a "Chinese restaurant A", the electronic device 500 may detect the "Chinese restaurant A" by retrieving an order history of the second speaker 502 from a memory in the electronic device 500 or from an external device (for example, a server or an external storage device) connected to the electronic device 500. When the "Chinese restaurant A" is detected, the electronic device 500 may generate a piece of speech content indicating that "Order two bowls of jajangmyeon from the Chinese restaurant A" by combining the piece of speech content of the first speaker 501 with "Chinese restaurant A", and may notify a result of the ordering to the first and second speakers 501 and 502 while performing an act of ordering two bowls of jajangmyeon from the Chinese restaurant A according to the generated piece of speech content. To perform the ordering act set forth above through the Internet, the electronic device 500 may execute an order application or make a connection to an order site through the Internet.

Figure 6:
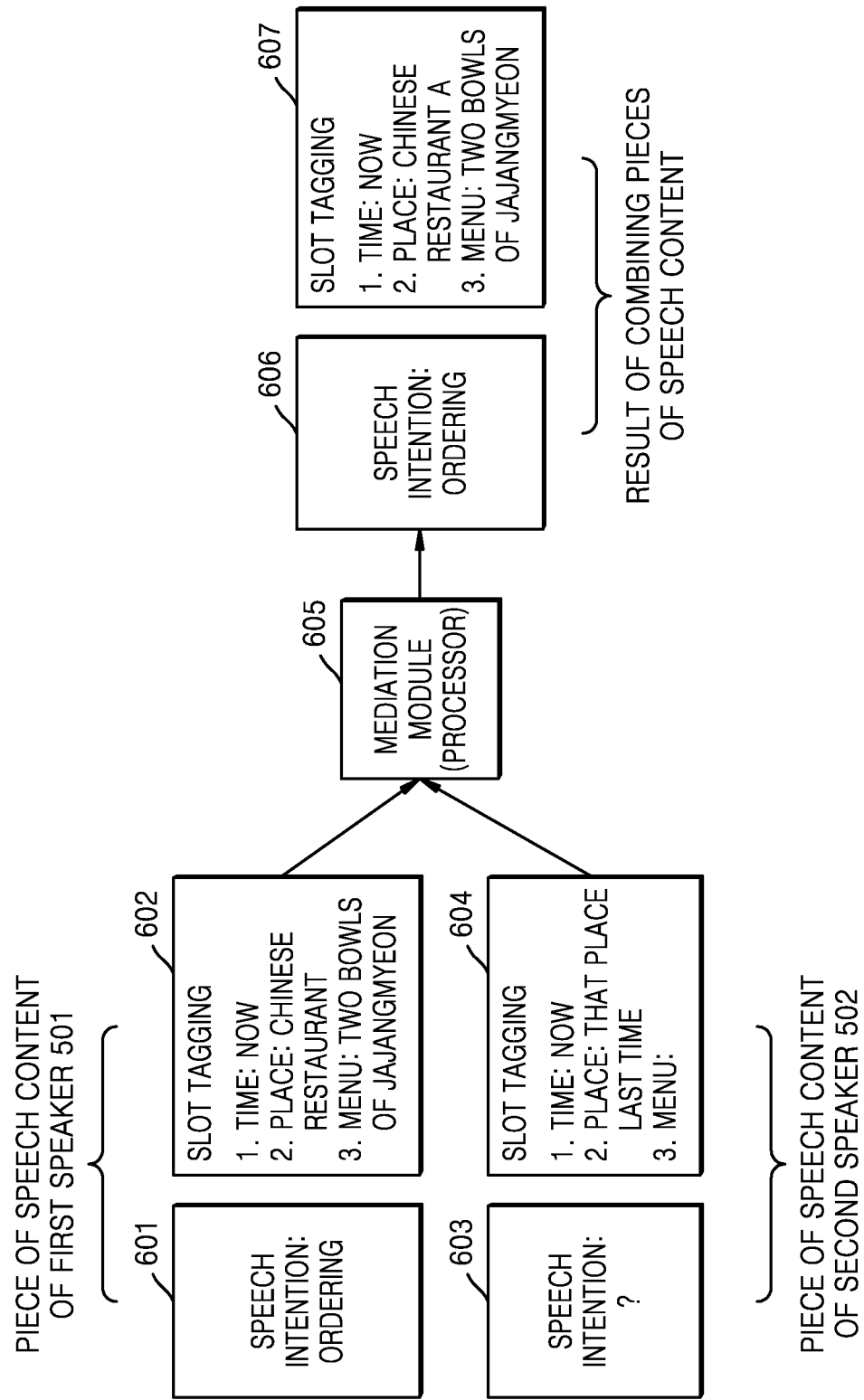
FIG. 6 is an example of performing mediation between a piece of speech content of a first speaker of FIG. 5 and a piece of speech content of a second speaker of FIG. 5.

FIG. 6 is an example of performing mediation between a piece of speech content of the first speaker 501 of FIG. 5 and a piece of speech content of the second speaker 502 of FIG. 5.

Referring to FIG. 6, the electronic device 500 analyzes the piece of speech content of the first speaker 501 and thus detects a speech intention 601 (for example, ordering) of the piece of speech content of the first speaker 501 and a speech item (or slot tagging) 602 (for example, time, place and menu items, and information corresponding to each item) included in the piece of speech content of the first speaker 501. In addition, the electronic device 500 may analyze the piece of speech content of the second speaker 502 and thus detect a speech intention 603 (in the case of FIG. 6, the speech intention is not known) of the piece of speech content of the second speaker 502 and a speech item 604 (for example, time, place and menu items, and information corresponding to each item) included in the piece of speech content of the second speaker 502.

The electronic device 500 allows a processor (for example, a mediation module) included in the electronic device 500 to perform a mediation (605) between the piece of speech content of the first speaker 501 and the piece of speech content of the second speaker 502, based on the detected speech intention and speech item of the first speaker 501 and the detected speech intention and speech item of the second speaker 502. As a result of the mediation, the electronic device 500 may determine that the speech intentions of the first and second speakers 501 and 502 is to place an order 606 and may generate a piece of speech content 607 including information about time, place, and menu items which are speech items included in the pieces of speech content of the first and second speakers 501 and 502.

Figure 7:
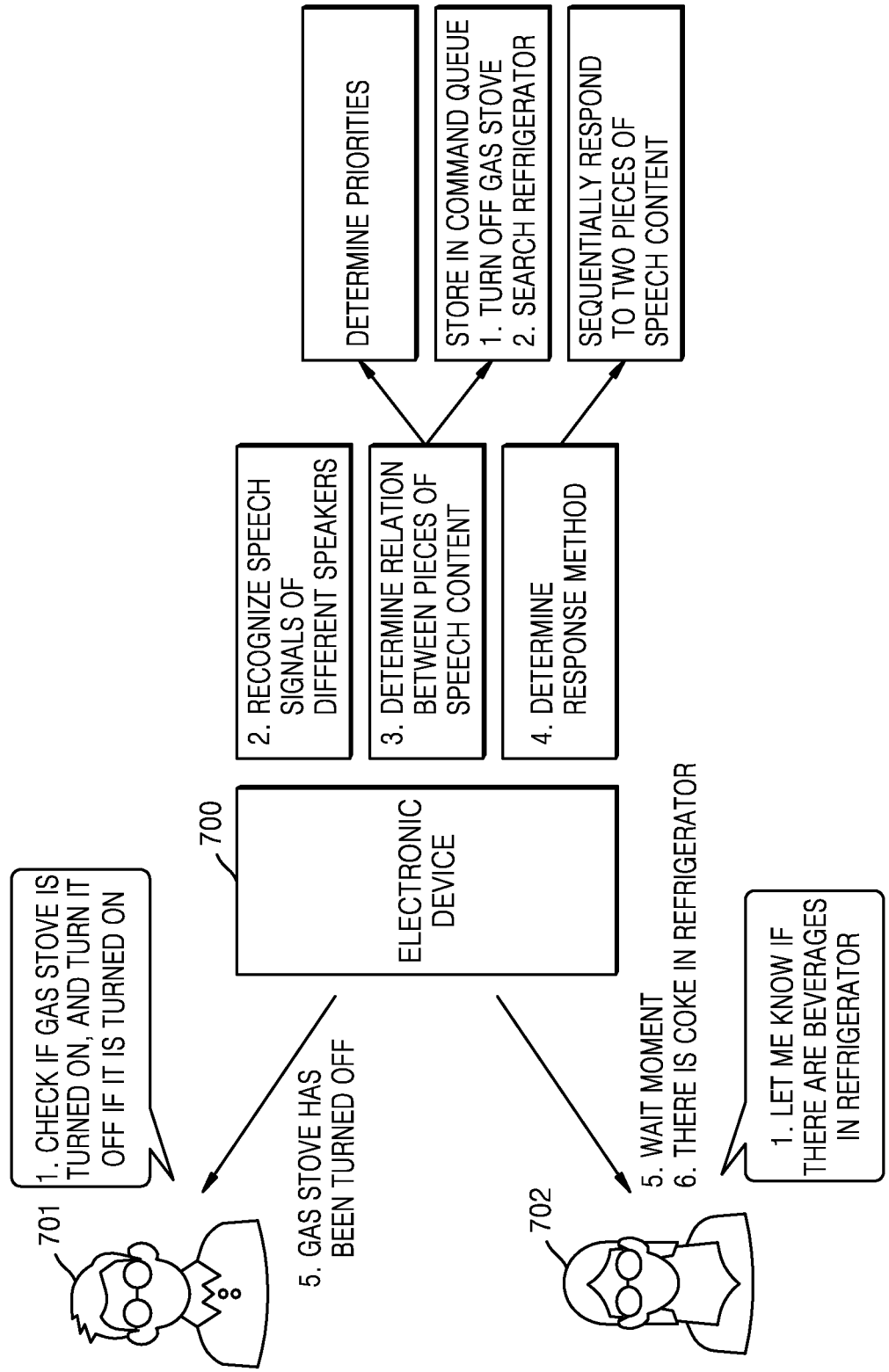
FIG. 7 is a diagram illustrating processing, performed by an electronic device, of speech signals spoken by a plurality of speakers, according to another embodiment.

FIG. 7 is a diagram illustrating processing, performed by an electronic device, of speech signals spoken by a plurality of speakers, according to another embodiment. FIG. 7 illustrates the case where a first speaker 701 and a second speaker 702 respectively speak pieces of speech content independent of each other.

FIG. 7 illustrates the case where the second speaker 702 is a wake-up registered speaker with respect to an electronic device 700. When speech signals are received from the first speaker 701 and the second speaker 702, the electronic device 700 recognizes the speakers. After recognizing the speakers, the electronic device 700 identifies a speech relation. As a result of identifying the speech relation, when it is determined that a relation between the first speaker 701 and the second speaker 702 is a family relation and that the pieces of speech content thereof are independent of each other, the electronic device 700 determines priorities of the pieces of speech content. As a result of determining the priorities, when it is determined that the piece of speech content of the first speaker 701 has a higher priority than the piece of speech content of the second speaker 702, the electronic device 700 stores each piece of speech content in a command queue such that the piece of speech content of the first speaker 701 has a higher priority than the piece of speech content of the second speaker 702.

The electronic device 700 determines priorities between the piece of speech content of the first speaker 701 and the piece of speech content of the second speaker 702 and stores, in a command queue, an execution command of the electronic device 700, which is based on each piece of speech content, according to the determined priorities. Referring to FIG. 7, the electronic device 700 stores a command to turn off a gas stove in a higher command queue than a command to search a refrigerator. This is because, in the electronic device 700, the word "gas stove" has a higher priority than the word "refrigerator". For the electronic device 700 to determine priorities based on words as described above, the electronic device 700 may store priority information about words in advance.

After storing the commands in the command queue according to the determined priorities, the electronic device 700 sequentially perform operations regarding the piece of speech content of the first speaker 701 and the piece of speech content of the second speaker 702, based on information stored in the command queue. When sequentially performing the operations, the electronic device 700 may provide, to the second speaker 702, notification information indicating that the second speaker 702 has to wait.

The electronic device 700 classifies a response method based on the determined speech relation. Because the pieces of speech content are independent of each other in the case of FIG. 7, the electronic device 700 responds on the basis of each piece of speech content. For example, because the piece of speech content of the first speaker 701 is stored in a high-priority command queue, the electronic device 700 may perform an operation regarding the piece of speech content of the first speaker 701 and notify a processing result thereof to the first speaker 701, and then, the electronic device 700 may perform an operation regarding the piece of speech content of the second speaker 702 and notify a processing result thereof to the second speaker 702.

Figure 8:
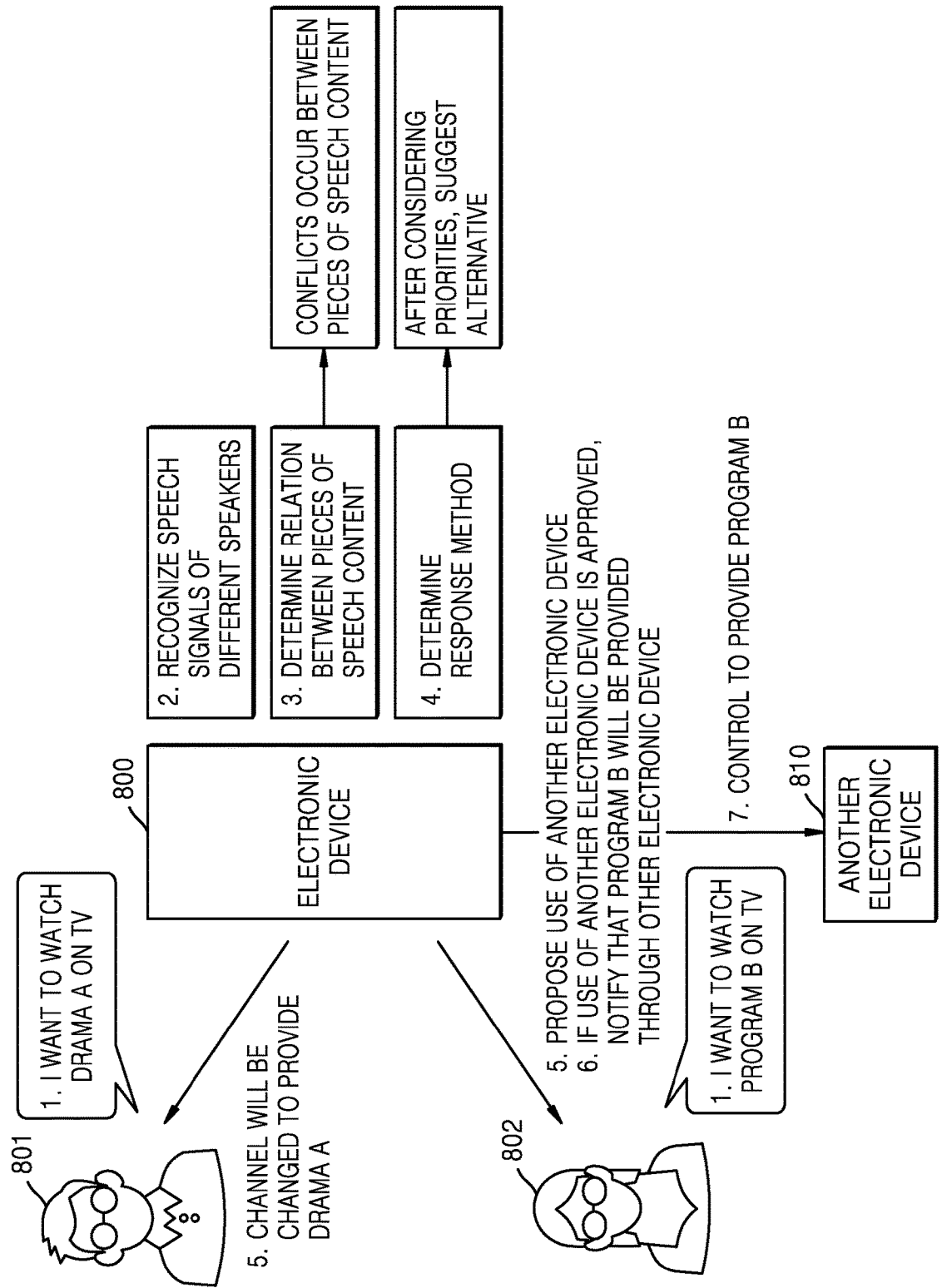
FIG. 8 is a diagram illustrating processing, performed by an electronic device, of speech signals spoken by a plurality of speakers, according to yet another embodiment.

FIG. 8 is a diagram illustrating processing, performed by an electronic device, of speech signals spoken by a plurality of speakers, according to yet another embodiment. FIG. 8 illustrates the case where pieces of speech content of the plurality of speakers are independent of each other in the same speech domain.

Referring to FIG. 8, a first speaker 801 may correspond to the first speaker 501 of FIG. 5, and a second speaker 802 may correspond to the second speaker 502 of FIG. 5. Alternatively, the first speaker 801 may correspond to the first speaker 701 of FIG. 7, and the second speaker 802 may correspond to the second speaker 702 of FIG. 7. Accordingly, a priority of the first speaker 801 may be set to be higher than a priority of the second speaker 802.

When an electronic device 800 receives a speech signal and determines that the received speech signal includes a speech signal of the first speaker 801 and a speech signal of the second speaker 802, the electronic device 800 may detect feature information of the speech signal of the first speaker 801 and feature information of the speech signal of the second speaker 802 and may determine a relation between a piece of speech content of the first speaker 801 and a piece of speech content of the second speaker 802, based on the detected feature information of each speech signal.

As a result of determining the relation between the pieces of speech content, because both the piece of speech content of the first speaker 801 and the piece of speech content of the second speaker 802 need to be performed by the electronic device 800, the electronic device 800 determines that the piece of speech content of the first speaker 801 and the piece of speech content of the second speaker 802 are generated in the same speech domain. Accordingly, the electronic device 800 determines that conflicts occur between the piece of speech content of the first speaker 801 and the piece of speech content of the second speaker 802.

While changing a channel to provide a drama A to the first speaker 801, the electronic device 800 may notify a processing result to the first speaker 801 and may propose use of another electronic device 810 to the second speaker 802. Accordingly, when the second speaker 802 approves use of the other electronic device 810, while notifying that a program B will be provided through the other electronic device 810, the electronic device 800 may control the other electronic device 810, thereby allowing the second speaker 802 to watch the program B through the other electronic device 810.

Figure 9:
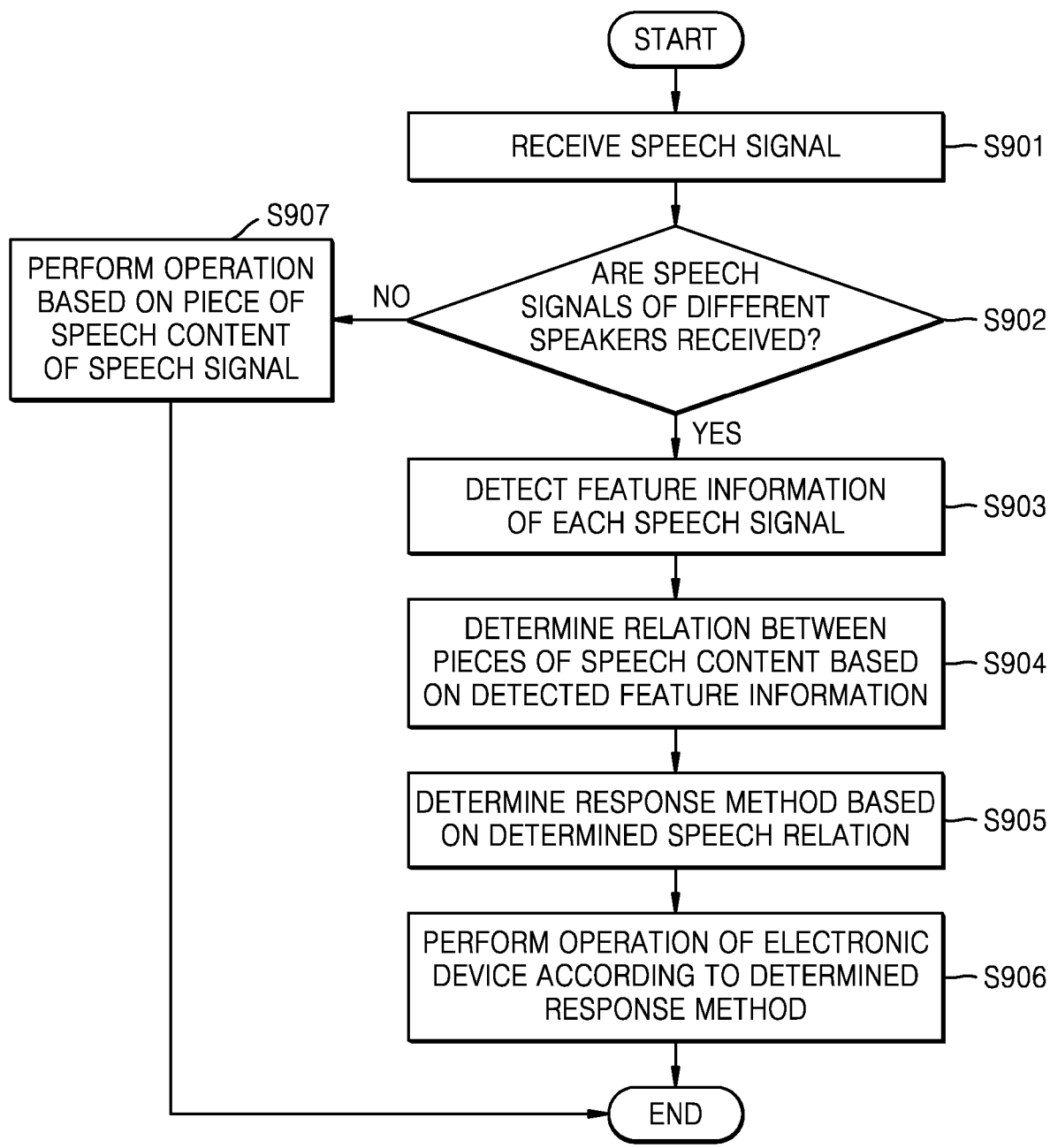
FIG. 9 is a flowchart illustrating a method, performed by an electronic device, of processing a speech signal, according to an embodiment.

FIG. 9 is a flowchart illustrating a method, performed by an electronic device, of processing a speech signal of a plurality of speakers, according to an embodiment. Hereinafter, although the flowchart of FIG. 9 will be described as being performed by the electronic device 100 of FIG. 1, the flowchart of FIG. 9 may be performed by each of the electronic devices 200, 300, 400, 500, 700, and 800 described above with reference to the respectively corresponding figures.

Referring to FIG. 9, in operation S901, the electronic device 100 receives a speech signal.

In operation S902, the electronic device 100 determines whether the received speech signal includes speech signals of different speakers. When it is determined that the speech signals of the different speakers are received, the electronic device 100, in operation S903, detects feature information of each of the speech signals of the different speakers. In operation S904, the electronic device 100 determines a relation between pieces of speech content of the plurality of speakers, based on the detected feature information. In operation S905, the electronic device 100 determines a response method based on the determined relation between the pieces of speech content of the plurality of speakers. In operation S906, the electronic device 100 performs an operation of the electronic device 100 according to the determined response method.

When it is determined in operation S902 that the received speech signal includes a speech signal of one speaker, the electronic device 100, in operation S907, performs an operation based on a piece of speech content of the received speech signal.

The embodiments of the present disclosure described above may be written in a program executable on a computer and may be implemented in a general-purpose digital computer that operates the program by using a computer-readable recording medium.

The computer-readable recording medium includes a storage medium such as a magnetic storage medium (for example, ROM, a floppy disk, a hard disk, or the like), an optical reading medium (for example, compact disc ROM (CD-ROM), a DVD, or the like), and a carrier wave (for example, transmission via the Internet).

The disclosed embodiments may be implemented by a software (S/W) program including instructions stored in computer-readable storage media.

The computer is a device, which may invoke the stored instructions from the storage media and be operated according to the disclosed embodiments based on the invoked instructions, and may include the electronic devices 100, 200, 300, 400, 500, 700, and 800 according to the disclosed embodiments.

The computer-readable storage media may be provided in the form of non-transitory storage media. Here, the term "non-transitory" merely means that storage media do not include signals and are tangible, whether data is semipermanently or temporarily stored in the storage media or not.

In addition, a control method according to the disclosed embodiments may be provided while included in a computer program product. The computer program product is merchandise and may be traded as between a seller and a purchaser.

The computer program product may include a S/W program and a computer-readable storage medium in which the S/W program is stored. For example, the computer program product may include merchandise (for example, an application) in the form of a S/W program electronically distributed through a manufacturer of the electronic device 100 or an electronic market (for example, an Internet-based store). For electronic distribution, at least a portion of the S/W program may be stored in a storage medium or be temporarily generated. In this case, the storage medium may be a storage medium of a server of a manufacturer, a server of an electronic market, or a relay server temporarily storing the S/W program.

The computer program product may include a storage medium of the server or a storage medium of the electronic device 100, in a system including the server and the electronic device 100. Alternatively, when there is a third device (for example, a smart phone) communicatively connected the server or the electronic device 100, the computer program product may include a storage medium of the third device. Alternatively, the computer program product may include the S/W program itself, which is transmitted from the server to the electronic device 100 or the third device or transmitted from the third device to the electronic device 100.

In this case, one of the server, the electronic device 100, and the third device may execute the computer program product, thereby performing the method according to the disclosed embodiments. Alternatively, two or more of the server, the electronic device 100, and the third device may execute the computer program product, thereby dispersively performing the method according to the disclosed embodiments.

For example, the server (for example, a cloud server, an artificial intelligence server, or the like) may execute the computer program product stored in the server, thereby controlling the electronic device 100, which is connected to the server through a network, to perform the method according to the disclosed embodiments.

As another example, the third device may execute the computer program product, thereby controlling the electronic device 100, which is connected to third device through a network, to perform the method according to the disclosed embodiments. When the third device executes the computer program product, the third device may download the computer program product from the server and execute the downloaded computer program product. Alternatively, the third device may perform the method according to the disclosed embodiments by executing the computer program product provided in a pre-loaded state.

Heretofore, although embodiments of the present disclosure have been described with reference to the accompanying drawings, it should be understood by one of ordinary skill in the art that the embodiments of the present disclosure may be implemented in different ways without departing from the spirit and scope of the present disclosure. Therefore, it should be understood that the foregoing embodiments of the present disclosure are provided for illustrative purposes only and are not to be construed in any way as limiting the present disclosure.

The invention claimed is:

1. An electronic device comprising:
a receiver receiving a speech signal;
memory storing one or more computer programs; and
one or more processors communicatively coupled to the receiver and the memory,
wherein the one or more computer programs include computer-executable instructions that, when executed by the one or more processors, cause the electronic device to:
control the receiver to receive the speech signal,
determine whether the speech signal comprises speech signals of a plurality of different speakers,
in response to determining that the speech signal comprises the speech signals of the plurality of different speakers, detect feature information from a speech signal of each speaker,
based on the feature information, determine relationships between speech content of the plurality of different speakers,
based on the determined relationships between the speech content of the plurality of different speakers, determine that speech content of a first speaker among the plurality of different speakers and speech content of a second speaker among the plurality of different speakers are generated in a same speech domain and that conflicts occur between the speech content of the first speaker and the speech content of the second speaker, and
based on the determining that conflicts occur and the determined relationships between the speech content of the plurality of different speakers, control the electronic device and at least one other electronic device to perform an operation corresponding to each speech content of the plurality of different speakers.

2. The electronic device of claim 1, wherein the feature information comprises at least one of speaker information, a speaker position, a voice volume, a speech time point, a speech domain, speech content, an inter-speaker relation, or a relation between a previous speaker and a current speaker.

3. The electronic device of claim 1, wherein the one or more computer programs further include computer-executable instructions that, when executed by the one or more processors, cause the electronic device to:
in response to the determined relationships between the speech content of the plurality of different speakers indicating different operations to be performed by the electronic device, determine priorities of the speech content of the plurality of different speakers.

4. The electronic device of claim 1, wherein the one or more computer programs further include computer-executable instructions that, when executed by the one or more processors, cause the electronic device to:
in response to the determined relationships between the speech content of the plurality of different speakers indicating a same operation to be performed by the electronic device, combine the speech content of the plurality of different speakers, and
based on the combined speech content, determine a response method such that an operation is performed by the electronic device.

5. The electronic device of claim 3, wherein the one or more computer programs further include computer-executable instructions that, when executed by the one or more processors, cause the electronic device to:
determine the priorities of the speech content of the plurality of different speakers by using information about the plurality of different speakers and the speech content of the plurality of different speakers including the determined relationships between the speech content of the plurality of different speakers.

6. The electronic device of claim 1, wherein the one or more computer programs further include computer-executable instructions that, when executed by the one or more processors, is cause the electronic device to:
classify the speech content into at least one of speech content requiring a prompt response, speech content to be piled up in a queue, and speech content not requiring a response, and
based on the classified speech content, determine a response method for the speech content of the plurality of different speakers.

7. The electronic device of claim 3, further comprising:
a display;
wherein the one or more computer programs further include computer-executable instructions that, when executed by the one or more processors, cause the electronic device to:
in response to determining the priorities of the speech content of the plurality of different speakers, provide, through the display, response method information with respect to the speech content of the plurality of different speakers.

8. The electronic device of claim 3, further comprising:
a communicator;
wherein the one or more computer programs further include computer-executable instructions that, when executed by the one or more processors, cause the electronic device to:
in response to determining the priorities of the speech content of the plurality of different speakers, provide, through the communicator to each device operated by the plurality of different speakers, response method information with respect to the speech content of the plurality of different speakers.

9. A method of an electronic device processing a speech signal, the method comprising:
receiving, by one or more processors of the electronic device, the speech signal through a receiver of the electronic device;
determining, by the one or more processors, whether the speech signal comprises speech signals of a plurality of different speakers;
in response to determining that the speech signal comprises the speech signals of the plurality of different speakers, detecting, by the one or more processors, feature information from a speech signal of each speaker;
based on the feature information, determining, by the one or more processors, relationships between speech content of the plurality of different speakers;
based on the determined relationships between the speech content of the plurality of different speakers, determining, by the one or more processors, that speech content of a first speaker among the plurality of different speakers and speech content of a second speaker among the plurality of different speakers are generated in a same speech domain and that conflicts occur between the speech content of the first speaker and the speech content of the second speaker; and
based on the determining that conflicts occur and the determined relationships between the speech content of the plurality of different speakers, controlling, by the one or more processors, the electronic device and at least one other electronic device to perform an operation corresponding to each speech content of the plurality of different speakers.

10. The method of claim 9, wherein the feature information comprises at least one of speaker information, a speaker position, a voice volume, a speech time point, a speech domain, speech content, an inter-speaker relationship, or a relationship between a previous speaker and a current speaker.

11. The method of claim 9, further comprising:
in response to the determined relationships between the speech content of the plurality of different speakers indicating different operations to be performed by the electronic device, determining, by the one or more processors, priorities of the speech content of the plurality of different speakers.

12. The method of claim 9, further comprising:
in response to the determined relationships between the speech content of the plurality of different speakers indicating a same operation to be performed by the electronic device, combining, by the one or more processors, the speech content of the plurality of different speakers; and
based on the combined speech content, determining, by the one or more processors, a response method such that an operation is performed by the electronic device.

13. The method of claim 11, wherein the determining of the priorities of the speech content of the plurality of different speakers is performed by using information about the plurality of different speakers and the speech content of the plurality of different speakers including the determined relationships between the speech content of the plurality of different speakers.

14. The method of claim 9, further comprising:
classifying, by the one or more processors, the speech content into at least one of speech content requiring a prompt response, speech content to be piled up in a queue, and speech content requiring no response; and
based on the classified speech content, determining, by the one or more processors, a response method for the speech content of the plurality of different speakers.

15. The method of claim 11, further comprising:
in response to determining the priorities of speech content of the plurality of different speakers, providing, by the one or more processors through a display included in the electronic device, response method information with respect to the speech content of the plurality of different speakers.

16. The method of claim 11, further comprising:
in response to determining the priorities of the speech content of the plurality of different speakers, providing, by the one or more processors through a communicator of the electronic device to each device operated by the plurality of different speakers, response method information with respect to the speech content of the plurality of different speakers.

17. A non-transitory recording medium having recorded thereon a program comprising instructions which, when executed by one or more processors of an electronic device, cause the electronic device to perform operations, the operations comprising:
receiving, by the one or more processors, a speech signal through a receiver of the electronic device;
determining, by the one or more processors, whether the speech signal comprises speech signals of a plurality of different speakers;
in response to determining that the speech signal comprises the speech signals of the plurality of different speakers, detecting, by the one or more processors, feature information from a speech signal of each speaker;
based on the feature information, determining, by the one or more processors, relationships between speech content of the plurality of different speakers;
based on the determined relationships between the speech content of the plurality of different speakers, determining, by the one or more processors, that speech content of a first speaker among the plurality of different speakers and speech content of a second speaker among the plurality of different speakers are generated in a same speech domain and that conflicts occur between the speech content of the first speaker and the speech content of the second speaker; and based on the determining that conflicts occur and the determined relationships between the speech content of the plurality of different speakers, controlling, by the one or more processors, the electronic device and at least one other electronic device to perform an operation corresponding to each speech content of the plurality of different speakers.

18. The non-transitory recording medium of claim 17, wherein the feature information comprises at least one of speaker information, a speaker position, a voice volume, a speech time point, a speech domain, speech content, an inter-speaker relationship, or a relationship between a previous speaker and a current speaker.

19. The non-transitory recording medium of claim 17, the operations further comprising:

in response to the determined relationships between the speech content of the plurality of different speakers indicating different operations to be performed by the electronic device, determining, by the one or more processors, priorities of the speech content of the plurality of different speakers.

20. The non-transitory recording medium of claim 17, the operations further comprising:

in response to the determined relationships between the speech content of the plurality of different speakers indicating a same operation to be performed by the electronic device, combining, by the one or more processors, the speech content of the plurality of different speakers; and based on the combined speech content, determining, by the one or more processors, a response method such that an operation is performed by the electronic device.

* * * * *